United States Patent [19]

Gött et al.

[11] 4,299,523
[45] Nov. 10, 1981

[54] MACHINE FOR STACKING MESH GRIDS WITH ALTERNATE GRIDS ROTATED THROUGH 180°

[75] Inventors: Hans Gött; Peter Fürndörfler; Fred Kögl; Klaus Ritter; Gerhard Ritter, all of Graz, Austria

[73] Assignee: EVG Entwicklungs-und Verwertungs-Gesellschaft m.b.H., Graz, Austria

[21] Appl. No.: 92,585

[22] Filed: Nov. 8, 1979

[30] Foreign Application Priority Data

Nov. 8, 1978 [AT] Austria ................................ 7999/78

[51] Int. Cl.³ .......................................... B65G 57/081
[52] U.S. Cl. ....................................... 414/55; 140/17; 271/65; 414/33; 414/740; 414/758; 414/54
[58] Field of Search ...................... 271/65; 414/30, 33, 414/54, 55, 59, 56, 62, 63, 225, 729, 743, 738, 739, 740, 766, 783, 754, 719, 758; 140/17

[56] References Cited

U.S. PATENT DOCUMENTS

| | | | |
|---|---|---|---|
| 3,039,626 | 6/1962 | Schreiner et al. | 414/55 |
| 3,307,715 | 3/1967 | Gött et al. | 414/55 |
| 3,490,612 | 1/1970 | Webers et al. | 414/55 |
| 3,770,144 | 11/1973 | DiFrank et al. | 414/55 X |
| 3,823,835 | 7/1974 | Gött et al. | 414/55 |

FOREIGN PATENT DOCUMENTS 2060219  6/1972  Fed. Rep. of Germany ........ 414/55

*Primary Examiner*—Frank E. Werner
*Attorney, Agent, or Firm*—Ernest F. Marmorek

[57] ABSTRACT

A machine for stacking mesh reinforcement grids alternatingly in initial and reversed orientations includes a frame on which the grids to be reoriented are held during the reversing operation. The frame is mounted on swivelling arms for swivelling therewith and for turning relative thereto between two positions, and the frame is turned through 180° relative to the arms during their swivelling to one of such positions and held stationary relative thereto during the swivelling toward the other position. Guide rails are retractably positioned along the feed path of the grids to support those grids which are not to be reoriented, prior to the retraction of such rails which takes place before the release of the reoriented grid from the frame.

4 Claims, 8 Drawing Figures

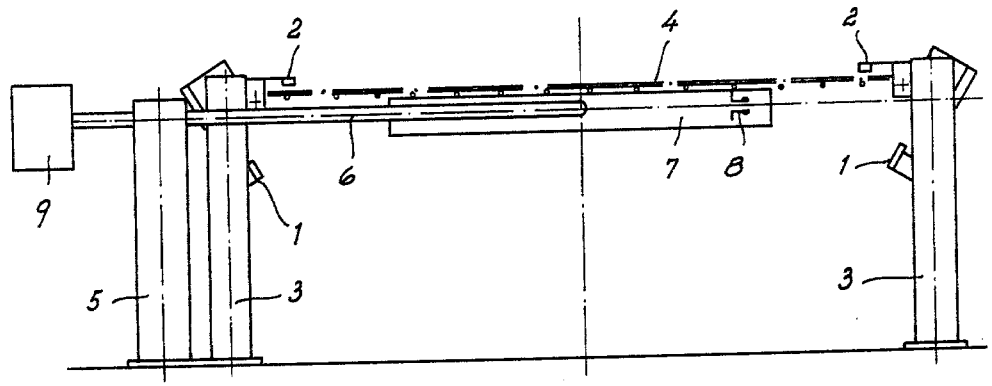
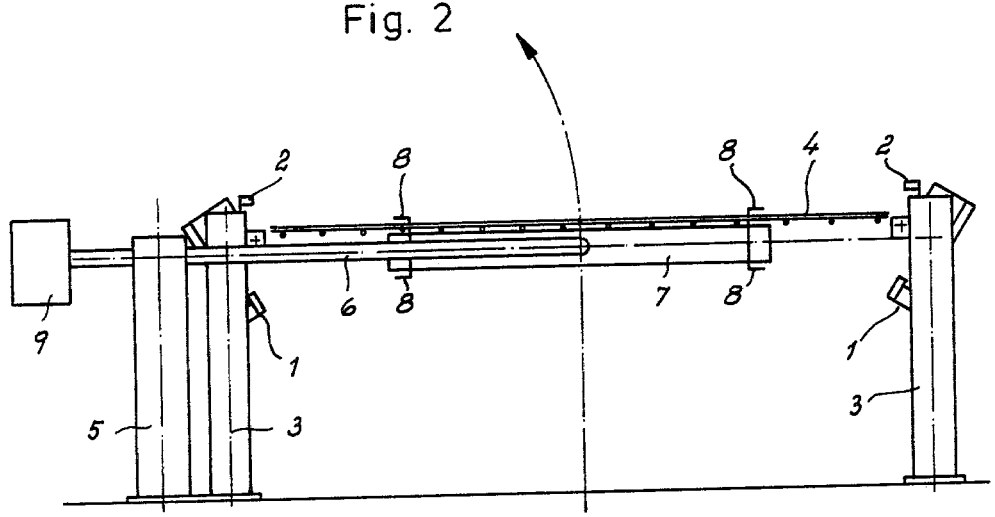

MACHINE FOR STACKING MESH GRIDS WITH ALTERNATE GRIDS ROTATED THROUGH 180°

BACKGROUND OF THE INVENTION

The invention relates to a machine for turning over of mesh reinforcement grids, emerging from mesh reinforcement welding machines, through 180°.

In the majority of the mesh reinforcement welding machines used nowadays the grids are made in horizontal positions with the longitudinal rods at the bottom and transverse rods at the top. On stacking the grids directly as they emerge from the mesh reinforcement welding machine on top of each other, the transverse rods of one grid lie against the longitudinal rods of the next grid at right angles.

However, if every other grid emerging from the mesh reinforcement welding machine is turned over through 180° about the longitudinal axes of the grids, then whilst the longitudinal rods in the first grid, which is not turned over, are situated below and the transverse rods at the top, on the second, turned-over grid, the transverse rods are at the bottom and the longitudinal rods at the top. The third grid, which once again is not turned over, has once again the longitudinal rods at the bottom and the tranverse rods at the top. Thus, it can be seen in this manner of stacking, the longitudinal rod groups of two grids which are situated one on top of the other and subsequently the transverse rod groups of two grids lying one on top of the other, are located in the same plane, whence the height of the mesh reinforcement grid stack can be reduced to half the value which would be obtained on stacking all grids in the same relative position.

In a known machine for turning over of the grids (DE-AS No. 2 060 219) a supplied grid picked up above the stacking station, lifted and turned over its longitudinal axis, it is lowered again and after a second grid which is not to be turned over has been supplied is, together with the latter, released on to the stack. This known arrangement is characterised by a guide frame with holding elements which travel apart and are used for picking up and releasing of the grids, and in which the frame is moved via swivelling arms between a lower picking up and an upper reversing position in which the frame can be turned over about its longitudinal axis.

Since in the known arrangement it is necessary to push a second grid onto the frame after turning over of the first grid and subsequently lowering to the initial position, before both grids can be released together for stacking, the stacking process is delayed.

In the known arrangement the frame is first moved away parallel to itself by a swivelling movement of the swivelling arms out of the feed path of the mesh reinforcement grids, and is then turned over in the same sense as the previous movement of the swivelling arms (now at standstill) and subsequently is returned by return swivelling of the swivelling arms parallel to itself into the feed path of the mesh reinforcement grids. The consequence of this is that the overall time used for the upwards swivelling, turning over, and return swivelling of the frame is relatively long, quite apart from the consideration that the turned-over frame must yet be loaded with the second grid, before the two grids, finally picked up by it, can be deposited on the stack. Especially in the case of modern, high rate welding machines, in which the longitudinal as well as the transverse rods are drawn from storage coils and processed in a continuous operation into interconnected continuous mesh reinforcement of great length, from which grids of required length are separated after the welding operation, the known turning over arrangements between the welding machine and the turning over arrangement require long outlet surfaces, which are used as storage for the mesh reinforcement which emerges continuously from the welding machine up to its separation into grids and for their picking up in the turning over machine. The space requirement of machines provided with these turning over arrangements is hence relatively great in the mesh reinforcement supply direction.

In addition the frame must be longer by an appreciable amount that the width of the widest mesh reinforcement grid to be turned over in order to ensure the separation of the holding elements on the frame for releasing of the grid held by them. Hence, the space requirement across the mesh reinforcement feed direction is also relatively great.

In addition to the great space requirement both these factors also cause increased material demand for the construction of the turning over machine and of the outlet surface to be provided in front of it. As a further consequence also the weight of the moving parts becomes greater, which once again results in higher demand for driving power.

OBJECTS AND SUMMARY OF THE INVENTION

An object of the invention is to improve the known grid-turning-over machines especially with regard to the time spent for stacking of two grids with opposite relative positions and further with regard to the required space and energy demand.

According to the present invention a machine for stacking mesh reinforcement grids, the machine having a frame equipped with automatically actuated holding elements for picking up and releasing of the mesh reinforcement grids supplied, the frame being rotatable about a longitudinal axis at the free ends of a pair of swivelling arms on which is supported, the swivelling arms being movable upwards from a lower, picking-up position, to a raised position in which the frame can be turned over relative to its initial position through 180°, is characterised in that the swivelling arms and the frame can be coupled together on upwards swivelling of the swivelling arms for swivelling movement in the opposite directions relative to one another into a position of alignment at the raised position of the swivelling arms, and that the swivelling arms and the frame can be locked in position relative to each other and swivelled back into the initial position together, guide rails being located for introduction selectively into the feed path of the mesh reinforcement grids for support of the grids, the guide rails being arranged to receive and support a grid which is not to be turned over, after swivelling of the frame out of its initial position the guide rails also being arranged to release the reinforcement grid before the return swivelling of the turned-over frame.

Together with the simultaneous and opposite swivelling movement of the swivelling arms and of the frame not only is the time required for turning over of one grid reduced, but also the feed path for an additional grid is rapidly freed, so that by means of the rails which are to be introduced into this feed path a second grid can be brought, during the time required for turning over of one grid, into the relative position above the stack and can be deposited on this stack. In this manner the depositing surface area necessary between the welding machine and the turning over machine for the mesh reinforcement emerging continuously from the welding machine is also reduced and as a further consequence the space and energy demand for the turning over arrangement is reduced.

BRIEF DESCRIPTION OF THE DRAWINGS

One example of a machine according to the invention will now be described with reference to the accompanying drawings in which:

FIG. 1 shows the machine during the introduction of a first grid;

FIG. 2 shows the machine after the completed introduction of the first grid, ready for the turningover operation;

DETAILED DESCRIPTION OF THE PREFERRED EMBODIMENT

Figure 3:
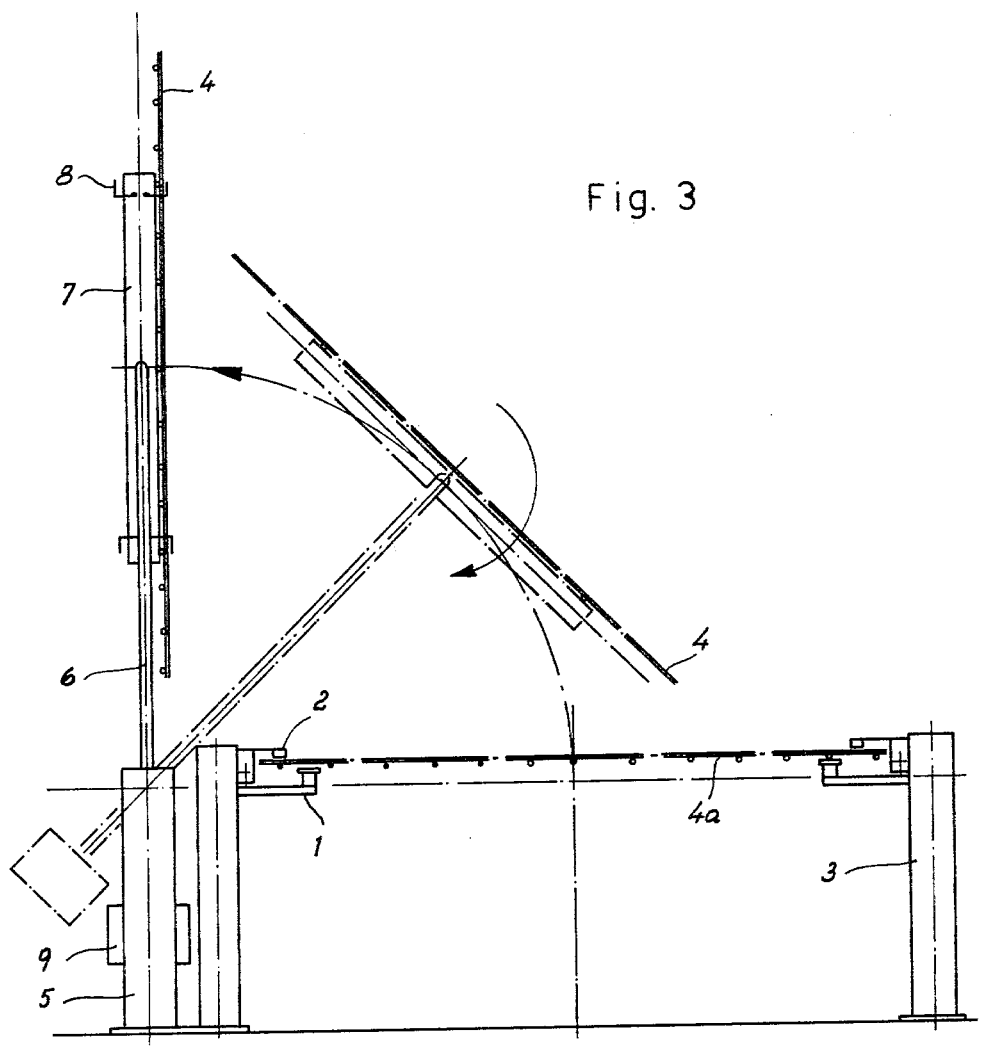
FIG. 3, shows the machine on turning over of the first grid, and at the same time the forward feeding of a second grid.

A machine for turning over grids has, on both sides of the feed path of the grids to be turned over, a lower guide rail 1 and an upper guide rail 2 for picking up of the grids 4 supplied to the machine. The guide rails 1 and 2 run parallel to each over and to the feed direction of the grids pushed into the machine and are arranged on both sides of the turning over and stacking space on support columns 3 set a predetermined distance apart.

The guide rails 1 and 2 are supported on the columns 3 so that they can be swivelled about an axis parallel to their longitudinal direction. The lower guide rails 1 extend, in the working position, deeper into the space used for picking up a grid 4 than the upper guide rails 2, so that, as indicated in FIG. 3, a clamping moment can be exerted on the edges of a grid 4 resting between the guide rails 1 and 2, which prevents a bending of the grid and hence the slipping away of the grid from the lower guide rails 1.

Swivelling arms 6 are arranged a distance apart on a support column 5. These are swivelled on axes parallel to the guide rails 1 and 2 and are situated below the feed path or the supply plane of the grids in their lowered position. The swivelling arms 6 carry at their ends a guide frame 7, which can be rotated about its middle, on the swivelling arms 6, about a longitudinal axis which is parallel to the swivelling axes of the guide rails 1 and 2.

In the guide frame 7 are arranged, longitudinally spaced apart, pairs of holding hooks 8. These hooks can be swivelled outwards, in the working position, so as to grasp the longitudinal rods of a grid resting on the guide frame and hold the grid firmly on the frame. During the feeding of a grid to the frame 7 the holding hooks 8 are swivelled back into a retracted position (FIG. 1), in which they are situated within the boundary surfaces of the frame and hence are prevented from engaging with the rods of the grids being fed in.

Figure 7:
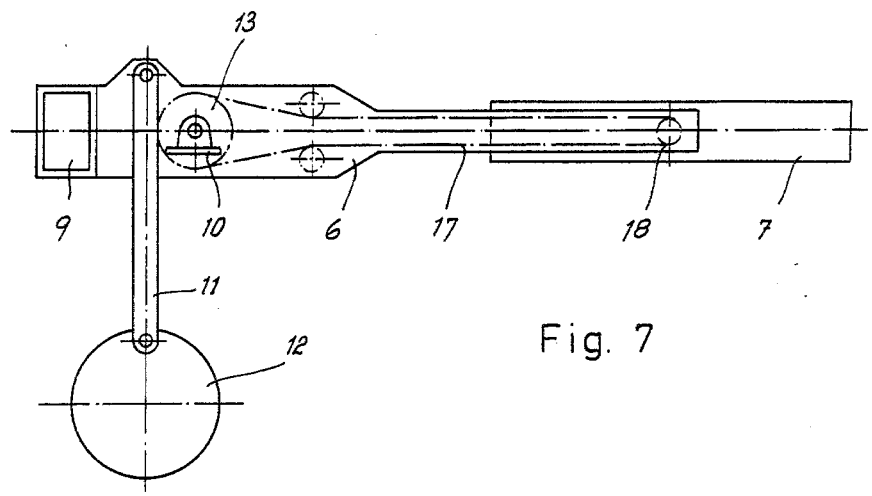
FIG. 7 shows the driving mechanism of the turning over arm and of the guide frame.

As shown in FIG. 2 each swivelling arm 6 carries on its end opposite the pivoting point 18 (see FIG. 7) of the frame 7 a counterweight 9 and is connected with a cranked drive 12 by a connecting rod 11 attached at a point between this counterweight 9 and the swivelling arm bearing 10.

The diameter of the crank 12, the distance of the pivot point of the connecting 11 on the swivelling arm 6 from the bearing point 10 and the position of these individual parts relative to each other are selected so that the swivelling arm 6 moves from its horizontal picking-up position to a vertical turning-over position on half a revolution of the crank 12 and, therefore on the other half revolution of the crank 12, is swivelled once again back into its horizontal picking-up position.

Figure 8:
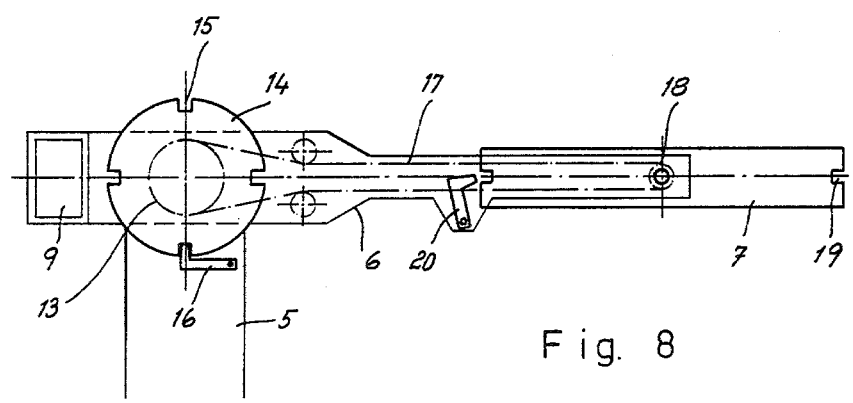
FIG. 8 shows further detail of the driving mechanism.

Coaxially with the swivelling arm bearing 10 is arranged a chain sprocket wheel 13 which, as shown in FIG. 8, is connected to a disc 14. Along the circumference of the disc 14 are arranged, at an angular spacing of 90°, four ratchet slots 15, into which is engageable a latch 16, arranged to swivel on the column 5. The sprocket wheel 13 is connected by a link chain 17 with a second sprocket wheel 18. The sprocket wheel 13 has twice as many teeth as the sprocket wheel 18, which in turn is fixedly connected to the frame 7. In addition the frame 7 has on its ends a ratchet slot 19, each of which engages with a latch 20 swivelling on the arm 6.

The swivelling arm 6 and the frame 7 are situated below the feed path of a mesh reinforcement grid 4 in the pick-up position. The holding hooks 8 have been retracted into the rest position and are situated within the boundaries of the frame 7. The upper guide rails 2 are above the feed path of the grid 4 in the horizontal working position, so that the first grid can be pushed into the machine onto the frame 7 (FIG. 1).

As soon as the first grid is completely pushed into the machine the upper guide rails 2 are brought into the vertical position (FIG. 2) and at the same time the holding hooks 8 are swivelled into the working position, so that they grip and firmly hold the grid 4, situated on the frame 7, on longitudinal rods (FIG. 2).

The crank 12 then rotates through half a revolution, whence the swivelling arms 6 and the frame 7, carrying the grid 4, are swivelled upwards through 90° from their horizontal pick-up position (FIG. 3).

During this movement, on each swivelling arm 6 the latch 16 is engaged with one of the ratchet slots 15 of the disc 14, but the latch 20 is not engaged with the associated ratchet slot 19. The disc 14 is hence held fast by the latch 16 so that the sprocket wheel 13 cannot follow the swivelling movement of the swivelling arm 6. The sprocket wheel 13 hence carries out a rotation through 90° relative to the swivelling arm 6. Since the sprocket wheel 18 is connected by the chain 17 with the sprocket wheel 13, and the tooth pitch of the sprocket wheel 18 is only half of that of the sprocket wheel 13, the sprocket wheel 18 and connected frame, perform a rotation of 180° relative to the swivelling arm 6, or relative to a fixed coordinate system, a rotation of 90° opposite to the rotational direction of the swivelling arm 6 (FIG. 3). Thus, when the swivelling arms 6 have reached the vertical position, the grid has been turned over relative to the swivelling arms through 180°.

Figure 4:
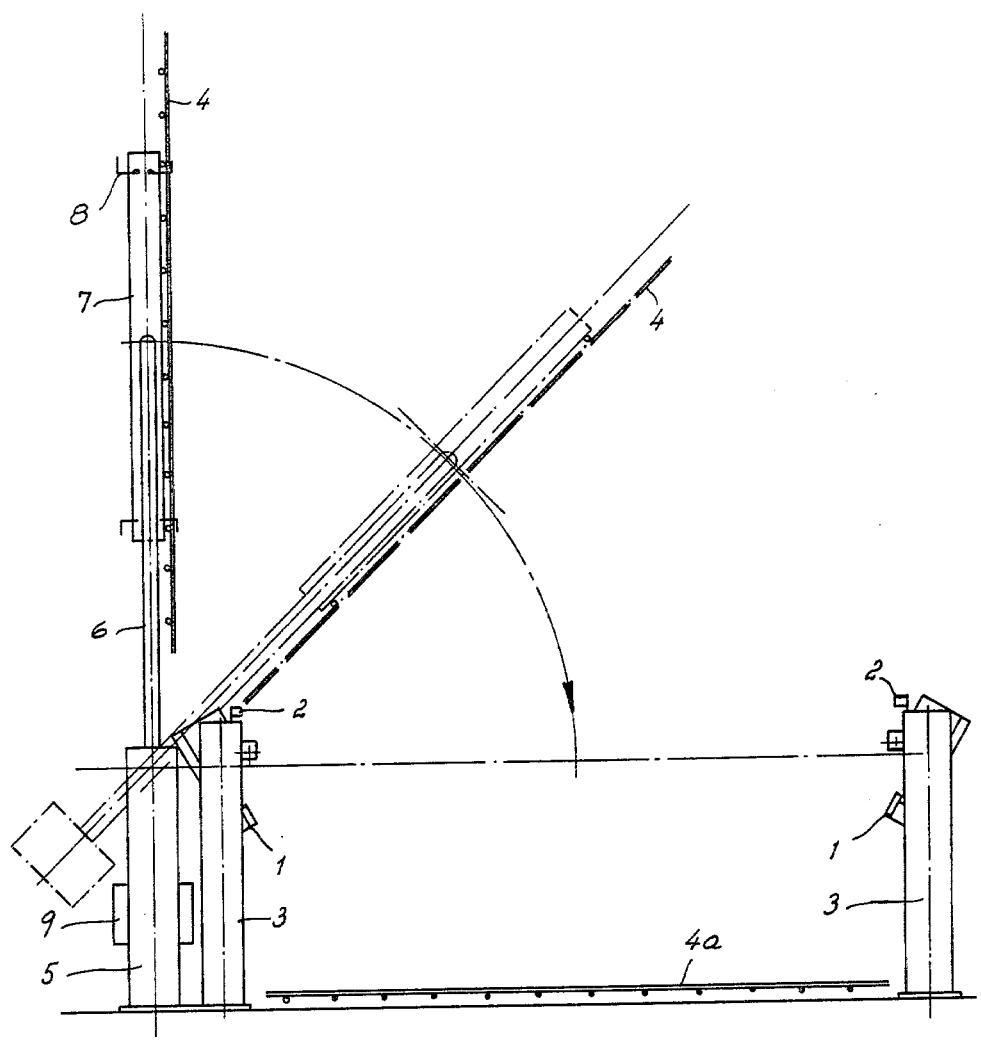
FIG. 4 shows the second grid is not-turned-over position deposited on the grid stack and the return of the first grid into position above the stack.

Immediately after the grid 4, which is to be turned over, is removed from the feed path of the machine, both guide rails 1 and 2 are swivelled into their horizontal working position and the feeding of a second, not-to-be-turned-over grid 4a starts, during the turning over operation of the first grid After the grid 4a has been pushed full length between the guide rails 1 and 2, then the guide rails are swivelled into the rest position and the grid 4a is released and dropped onto the stack (FIG. 4).

Simultaneously with this operation the latch 16 is released from the ratchet slot 15 of the disc 14 on each of the swivelling arms 6, whence the disc 14 and sprocket wheel 13 are released, so that they can move relative to the support column 5. At the same time, the locking latch 20 is engaged with one of the ratchet slots 19 of the frame 7, and frame 7 is therefore locked in position relative to the swivelling arm 6.

If the crank 12 is now rotated once again through half a revolution to its original position, then the swivelling arm 6 and the frame 7 return, together with the grid 4 held firmly on the frame 7, to their initial position (FIG. 4), but with the frame 7 reversed through 180°.

Figure 5:
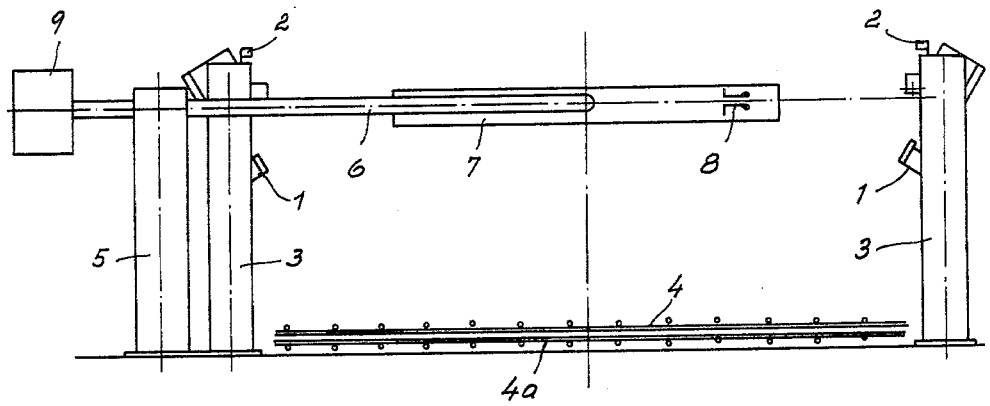
FIG. 5 shows the releasing of the turned over panel on the stack.
Figure 6:
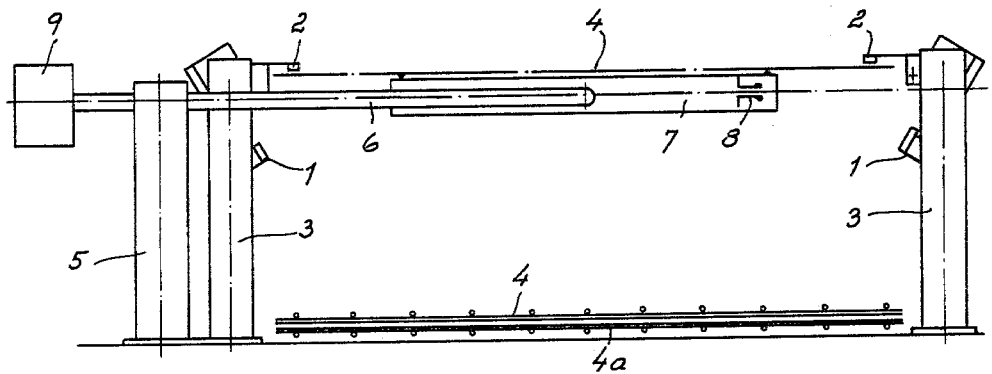
FIG. 6 shows the start of the feed movement of a third grid.

After the swivelling arms 6 have reached their initial position then the holding hooks 8 on the frame 7 are moved back into their retracted position and the grid 4 is released for deposition on the stack, over the grid 4a (FIG. 5).

Both grids 4 and 4a are now situated in such relative positions on top of each other that their transverse rods can lie in the same plane. A new swivelling operation can now be started.

The actuation of the guide rails 2, the holding hooks 8, as well as the locking latches 16 and 20 and actuation of the crank 12, is carried out with a programmed control by any suitable means and does not require any detailed explanation.

The feed of the grids to the turning-over machine from the support table situated between the welding machine and the turning-over machine can be carried out advantageously with the aid of rubber tyred wheels (not shown) arranged above the support table.

A wide variety of modifications in design are clearly possible with regard to the individual components of the above described machine within the framework of the invention.

We claim:

1. A machine for stacking mesh reinforcement grids, said machine defining a feed path for said grids and having a frame, said frame being equipped with automatically actuated holding elements for picking up and releasing said mesh reinforcement grids at said feed path; a pair of swivelling arms, said arms being movable upwards from an initial lower, picking-up position to a raised position, said frame being mounted on and rotatable about a longitudinal axis defined at the free ends of said arms, said frame being adapted to be turned over relative to its initial position through 180° when said arms are in the raised position, the improvement comprising means for coupling together said arms and said frame on upward swivelling of said arms, to cause said frame and said arms to swivel in opposite directions relative to one another, said means causing said frame and said arms to be aligned with one another in said raised position, and means for locking said frame in position on said swivelling arms whereby said frame and said arms can be swivelled back into the initial position together; and guide rails adapted to be introduced into said feed path for support of said grids, said guide rails being arranged to receive and support a grid which is not to be turned over, after swivelling of said frame out of its initial position, said guide rails also being adapted to release said second mesh reinforcement grid before said first grid is returned on said frame to said lower position whereby said first turned-over grid is released and stacked on top of the second grid.

2. A machine according to claim 1, wherein said coupling means comprises a chain drive having a transmission ratio of 1:2, said chain drive having a first sprocket wheel rotatingly positioned on the swivel axis of said swivelling arms, said first sprocket wheel being adapted to be held stationary during upward swivelling of said arms, and a second sprocket wheel fixedly connected relative to said frame.

3. A machine according to claim 2, wherein said coupling means further includes latch means for holding said first sprocket wheel in fixed position during upwards swivelling of said swivelling arms, and second latch means for locking said frame relative to said swivelling arms on downward swivelling of said arms.

4. A machine according to claim 1, wherein said guide rails comprise upper and lower guide rails pivotable into the feed path of said grids from above and below respectively, said lower guide rails projecting further into said feed path than said upper guide rails.

* * * * *